United States Patent [19]

Masterson et al.

[11] Patent Number: 5,073,851
[45] Date of Patent: Dec. 17, 1991

[54] APPARATUS AND METHOD FOR IMPROVED CACHING IN A COMPUTER SYSTEM

[75] Inventors: Anthony Masterson; Mark Krueger, both of Cupertino, Calif.

[73] Assignee: Apple Computer, Inc., Cupertino, Calif.

[21] Appl. No.: 482,790

[22] Filed: Feb. 21, 1990

[51] Int. Cl.$^5$ .............................................. G06F 13/00
[52] U.S. Cl. ................................ 395/425; 364/243.41; 364/DIG. 1
[58] Field of Search .................... 364/200; 365/189.04, 365/189.05, 830.07

[56] References Cited

U.S. PATENT DOCUMENTS

| | | | |
|---|---|---|---|
| 4,126,894 | 11/1978 | Cronshaw | 364/200 |
| 4,208,716 | 6/1980 | Porter | 364/200 |
| 4,245,304 | 1/1981 | Porter | 364/200 |
| 4,315,312 | 2/1982 | Schmidt | 364/200 |
| 4,835,678 | 5/1989 | Kofuji | 364/200 |
| 4,885,680 | 12/1989 | Anthony et al. | 364/200 |
| 4,912,631 | 3/1990 | Lloyd | 364/200 |

OTHER PUBLICATIONS

IBM Technical Disclosure Bulletin, vol. 25, No. 1113, Apr. 1983, 'Cache Miss History Table', R. N. Rechtschaffen.

Primary Examiner—Dale M. Shaw
Assistant Examiner—Andrew Bodendorf
Attorney, Agent, or Firm—Blakely, Sokoloff, Taylor & Zafman

[57] ABSTRACT

A cache management system for a computer system having a central processing unit, a main memory, and cache memory including a memory management unit for transferring page size blocks of information, apparatus for reading information from main memory, apparatus for writing information to the cache memory, and apparatus for overlapping the write of information to the cache memory to occur during the read of information from the main memory.

4 Claims, 3 Drawing Sheets

APPARATUS AND METHOD FOR IMPROVED CACHING IN A COMPUTER SYSTEM

BACKGROUND OF THE INVENTION

1. Field of the Invention

This invention relates to computer systems and, more particularly, to methods and apparatus for improving the speed of operations of a computer system by means of improved caching arrangements.

2. History of the Prior Art

A typical general purpose computer comprises among other elements a central processing unit which operates under program instruction to accomplish control, logic, and arithmetic functions; a main memory usually made up of random access memory in which instructions and data are stored for use by the central processing unit; supplemental long term memory; input-/output control apparatus for moving information between the outside world and the computer; and some arrangement for displaying the results of operations such as a display monitor. Computers operate through their central processing units by storing programs (sets of instructions) and data in memory and selectively retrieving those instructions and data to the central processing unit for manipulation.

Computers become more capable by increasing the speed of operation and the amount and complexity of the information they can handle. The main way in which this is accomplished is by making the central processing units and memory faster and the memory space larger. Unfortunately, more memory is more expensive and faster memory is much more expensive. Consequently, caching arrangements have evolved. A cache is a relatively small amount of high speed memory used between the central processing unit and the main memory in a computer system to improve the speed of operation of the system by storing those instructions and that data which is used most often in a program. A correctly designed caching arrangement will usually contain (over ninety percent of the time) the information sought by the central processing unit. Thus, the central processing unit is usually operating with the faster cache memory, and the overall speed of operation of the system increases.

There have been many different caching arrangements designed to increase the speed of operation of computer systems. Typically, a cache memory utilizes an associated tag memory in which the main memory addresses of information stored in the cache are kept. When a request is directed to memory for information at a particular address, the address is compared with the addresses in the tag memory. If the address resides in the tag memory, the information is accessed from the cache memory; if not, then main memory is accessed for the information. The tag memory, though small, is very expensive.

It is typical for a cache memory to receive a small amount such as thirty-two bytes of information in each access of main memory. The time required to transfer such a small amount of information is relatively insignificant. However, a cache can be designed to receive information at higher rates, for example, in blocks of one, two, or four kilobytes at a time. The time required to accomplish a transfer from main memory with such a cache, is relatively significant in the overall system operation. Moreover, when there is a miss (the information is unavailable) in a cache memory, then the central processing unit must move the information from main memory to the cache memory and then access the information in the cache for use. This process of transferring the information takes a substantial amount of time in a system which fills the cache in large increments.

SUMMARY OF THE INVENTION

It is, therefore, an object of the present invention to increase the speed of operation of computer systems.

It is another object of the present invention to increase the speed of operation of a computer system which utilizes cache memory.

It is another more specific object of the present invention to increase the speed of operation of a computer system which utilizes cache memory which is filled in relatively large increments.

These and other objects of the present invention are realized in a computer system which utilizes a cache memory which is filled from main memory in blocks equivalent to a page of main memory, which utilizes a memory management unit rather than a tag memory to accomplish the access of the cache memory, which includes a counter to sequentially write information into the cache memory during the access of main memory after a cache miss, and which utilizes a novel arrangement for controlling the memory management arrangement in order to eliminate a substantial number of main memory accesses to accomplish cache fills.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing art to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
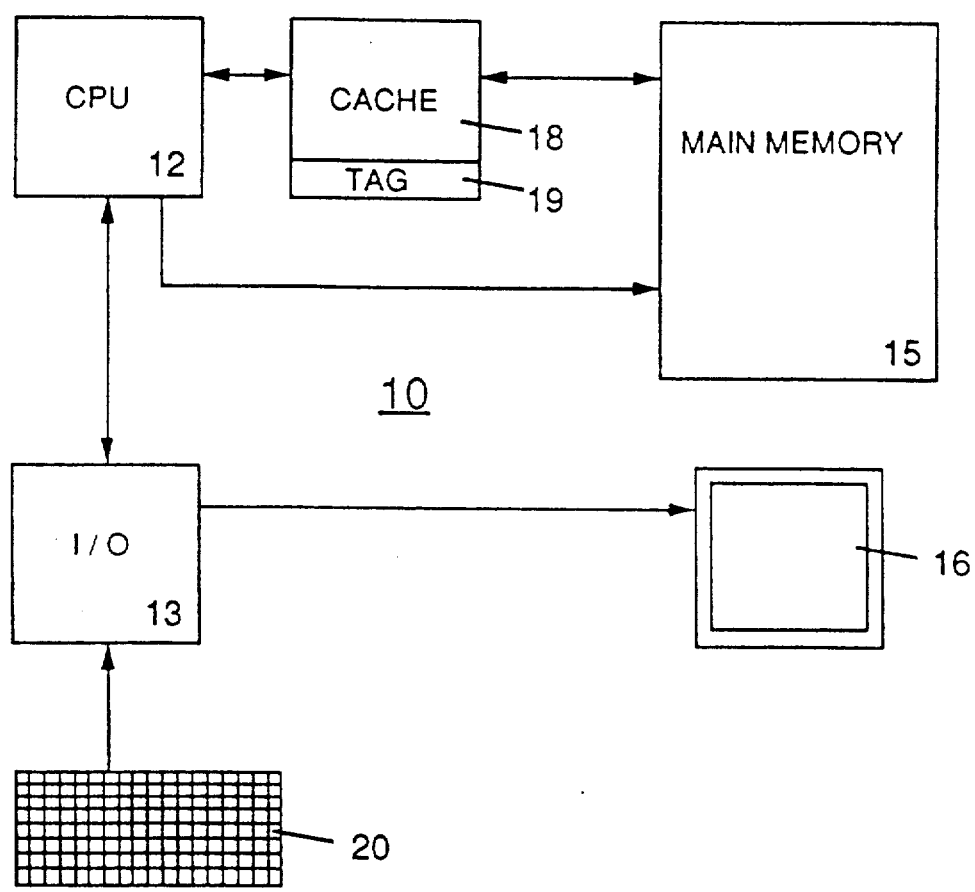
FIG. 1 is a block diagram illustrating a typical computer system of the prior art having a cache memory for increasing the speed of system operation.

FIG. 1 illustrates in block diagram form a typical general purpose computer system 10 of the prior art. The system 10 includes a central processing unit 12, input/output circuitry 13, main memory 15, output display device 16, and input/output device 20. The system 10 also includes cache memory 18 interposed between the central processing unit 12 and main memory 15. In operation of the system 10, various programs are stored in main memory 15 along with the data relating thereto. The instructions and data of any particular program are accessed by the central processing unit 12 from the main memory 15 during operation of the program. In order to speed the operation of the system 10, a tag memory 19 associated with the cache memory 18 reviews the addresses of information requested by accesses of main memory 15. If the information at the desired address is present in the cache memory 18, then the information is accessed in the cache memory 18 rather than the main memory 15.

If, on the other hand, the information desired is not available in the cache memory 18, then the typical system 10 transfers the information at the requested address in main memory 15 to the cache memory 18 and places a copy of the address in the tag memory 19. Upon the next access of the address, the tag memory 19 indicates that the information at the address accessed is present in the cache memory 18; and the information is accessed from the cache memory 18. As will be appreciated, this speeds the operation of the system 10 because, among other things, the cache memory 18 is usually constructed of devices which operate at a faster rate than do the devices of the main memory 15.

A first problem of such prior art systems, which has been pointed out above, is that the devices of which the tag memory 19 are constructed are quite expensive so that as the cache memory 18 becomes larger and the number of addresses stored increases, the price of that tag memory 19 becomes a significant system cost. To reduce the cost of the devices used in the tag memory 19 of the prior art system 10 and to speed the operation of a system transferring large blocks of information during cache fill operations, the system 30 illustrated in FIG. 2 has been deviced. The system 30 includes a central processing unit 12, a cache memory 18, and a main memory 15. Input/output circuitry, an output display device, and other devices illustrated in the system 10 of FIG. 1, although included in the system 30, are not illustrated because they are not pertinent to the explanation of the invention.

Rather than utilizing the expensive conventional tag memory 19 illustrated in FIG. 1, the system 30 utilizes a memory management unit 32 to accomplish the access of information in the cache memory 18. In general, a memory management unit is a device furnished as a part of a processor chip with many of the more advanced processors. Such a memory management unit is usually used in virtual memory systems. For example, such a unit is included in the AM29000 processor manufactured by Advanced Micro Devices.

A virtual memory system is one in which a programmer may address all of the system memory as though it were a part of main memory. The programmer provides addresses (called virtual addresses), and the memory management unit controls where the information at the virtual address is actually placed. The information may be in main memory or in some supplemental storage such as a hard disk. In the usual case, the memory management unit and the central processing unit cooperate to build a set of look-up table in which the virtual address is translated to the physical memory address (and vice versa) when the information needs to be accessed. Such a virtual memory system allows a computer system to be constructed with an address space much larger than the random access memory, conserving on the use of expensive random access memory.

Figure 3:
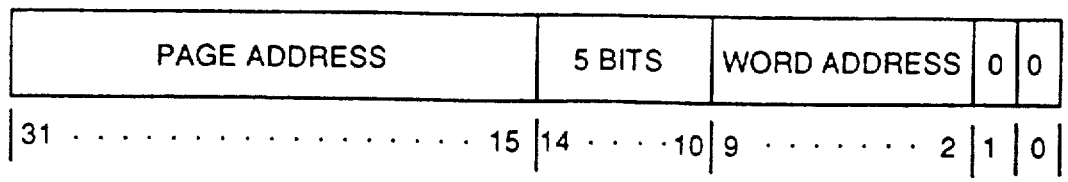
FIG. 3 is a diagram illustrating the arrangement of individual bits of binary information with an address in the preferred embodiment of the system.

In a virtual memory system, information which is accessed and is not in main memory is transferred to main memory in blocks called pages and stored in main memory in these page size units. These pages are swapped in and out of main memory as needed by the system in running various programs. Pages may be of any size but generally are of from one to eight kilobytes in size. A page is usually addressed by its page number and an offset within the page. FIG. 3 illustrates the makeup of a thirty-two bit virtual address used in the system of the preferred embodiment. The lowest two bits of the address are unused. The next eight bits contain the word address within a page of memory. The next five bits contain a binary-code line address. The seventeen high order bits provide the page address of the information in memory.

In the present invention, the memory management unit 32 is utilized to provide access to the cache memory 18. The cache memory 18 is referred to as a virtual cache because it is addressed by the virtual address, which is used to address the same information in main memory 15. The cache memory 18 is capable of storing sixty-four kilobytes of information. In the preferred embodiment, information is placed in the cache memory 18 in one kilobyte page-sized blocks when the cache memory 18 is filled.

When information is stored in the cache memory 18, the virtual address and the physical address to that information are stored by the memory management unit 32. When the information at a particular virtual address is accessed, the memory management unit 32 looks to see whether it contains the virtual address for that information indicating that the information is stored in the cache memory 18. If the virtual address is stored in the memory management unit 32, then the information is accessed in cache memory 18 and need not be accessed in main memory 15. This speeds the operation of the system in essentially the same manner as does the use of the tag memory without requiring the use of the expensive components of the tag memory.

However, memory management units are designed to transfer relatively large amounts of information because of their primary use in virtual memory systems. In general, the smallest page size which may be transferred is one kilobyte. This presents a problem when a memory management unit is used for the control of a cache because of the time required to fill the cache memory 18 in case of a cache miss. While the amount of information to be transferred from the main memory 15 in a typical cache system is small so that the time is relatively insignificant for each transfer, a cache miss in a system with long fill times requires a much longer time for each individual transfer. Moreover, in a typical prior art cache system, when a cache miss occurs, a block of information is first transferred from the main memory 15, then written to the cache memory 18, and finally the information at the address accessed is transferred to the central processing unit 12 for unit. Thus, a cache miss is quite time consuming with a long cache fill time.

To overcome this problem, the memory management unit 32 has associated with it an arrangement which further reduces the time required for operation of the system 30. In the typical system, a cache fill takes the read time for main memory 15, then the time required to write the cache memory 18, and finally the time required by the central processing unit to read the cache memory 18. In the arrangement of this invention, information is written to the cache memory 18 during the same period it is being accessed in the main memory 15 substantially reducing the time necessary to fill the cache memory 18 using the prior art system. The effect is that the operation takes only the time required to read the main memory 15 in order to both read the main memory 15 and fill the cache memory 18.

Figure 2:
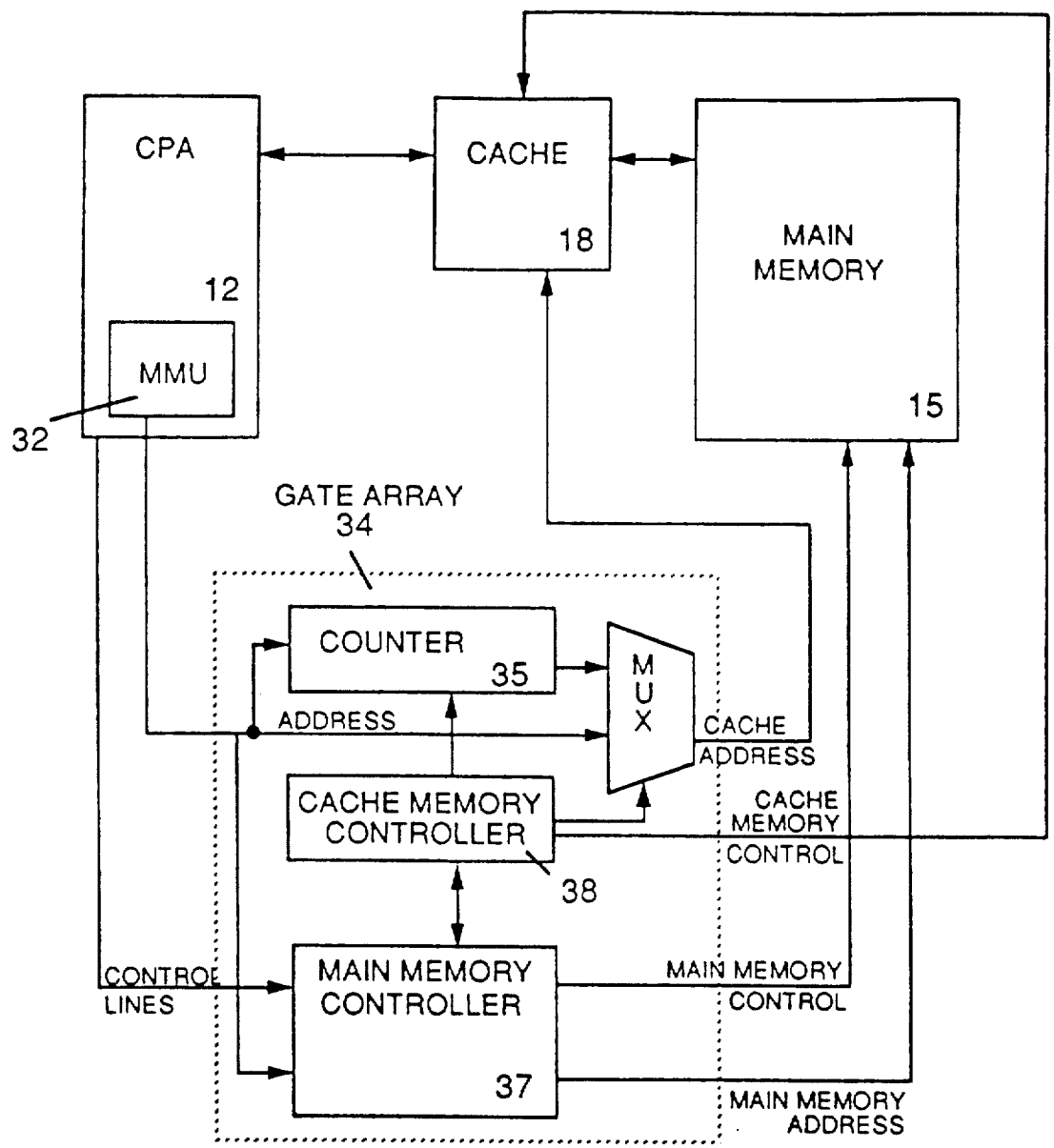
FIG. 2 is a block diagram of a computer system constructed in accordance with the invention.

This arrangement is included within a gate array 34 illustrated in FIG. 2. The gate array 34 includes a counter 35 which for a cache miss receives from the central processing unit 12 the starting cache address to be copied. When a cache miss occurs and the information is accessed in main memory 15, the central processing unit 12 puts the gate array into cache copy mode and causes a multiplexor 39 to enable cache address output from the counter 35. The address for the missing page in cache memory is passed to a main memory (DRAM) controller 37 used for accessing the main memory 15. As the cache page is accessed in main memory 15, the DRAM controller 37 provides an output enable signal to the main memory 15 and causes a cache memory controller 38 to provide a cache memory write enable signal. Then as the information in the main memory 15 is accessed using the addresses in main memory 15 furnished by the central processing unit 12, the output is written into the cache memory 18. At the same time the counter 35 provides incremented line addresses via the multiplexor 39 to the cache 18. The present system substantially simultaneously overlaps the read access of the main memory 15 and the write access of cache memory 18 such that, for example when byte 2 is being read, byte 1 is being written and when byte 3 is being read, byte 2 is being written, etc. in a preferred embodiment of the invention, the time for filling the cache is reduced to less than one-half that required for the central processing unit 12 to perform the copy operation. This is especially important where the cache memory 18 is arranged to be filled in blocks of one kilobyte of information at a time.

Figure 4:
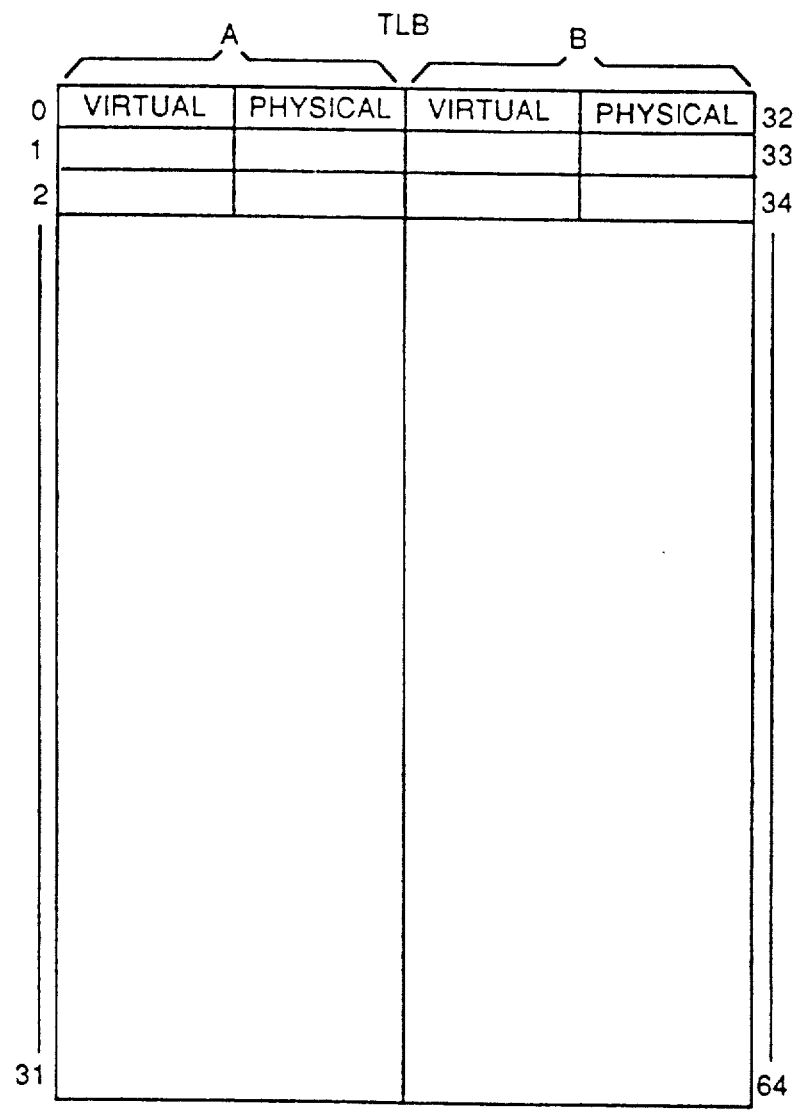
FIG. 4 is a diagram illustrating the arrangement of information within the memory management unit of the computer system illustrated in FIG. 2.

The arrangement of the present invention can be made to operate even more rapidly through an optimization. FIG. 4 illustrates in more detailed form the arrangement of the memory management unit 32 utilized in the preferred embodiment of the invention. The particular memory management unit 32 is of a relatively simplified form often referred to as a translation look-aside buffer. The particular translation look-aside buffer includes two sections A and B and a number of lines of storage. Each line of the translation look-aside buffer is capable of storing two sets of addresses, one set in each of the sections A and B. Thus, the buffer is essentially a two-way set associative memory. Each set of addresses includes the virtual address and the physical address of particular information which is to be accessed. The sets of addresses on any line of the translation look-aside buffer are addresses of information which is held in cache memory 18.

The set of addresses for any page of information stored in the cache memory 18 is stored in the translation look-aside buffer at the line designated in the five bits of the address which give the line number. Five bits of binary information are capable of designating thirty-two different lines. When information at an address with a particular line number is placed in the cache memory 18, the virtual address is placed at that line number in the translation look-aside buffer along with its physical address in the cache. Since only two sets of addresses may be entered for any line number, if more than two addresses having the same line number are accessed and stored in the cache memory 18, the typical memory management unit removes one of the pages of information from the cache memory 18, removes its set of addresses from the translation look-aside buffer, and replaces them with the new page and the new address, respectively. If three particular pieces of information with the same line address are used frequently, this requires that many pages of information be removed from the cache memory 18 very frequently. This may happen often for a programmer normally puts the address of the calling process in one of the entries on a line and the called process in the other even though the pages may be thirty-two kilobytes away from each other physically in cache memory 18. This allows rapid switching between processes in a program. Reducing the page size to one kilobyte to make it copy into the cache memory 18 as fast as possible means that sometimes there are three routines all with the same line address. If the virtual address does not match either of the virtual addresses stored at that line, then the processor normally has to copy the information into the cache memory 18. This is costly to the speed of operation of the system and statistically seems to occur about fifteen percent of the time when the cache memory 18 is used for storing instructions.

To overcome this problem, the present invention constructs for each line in the translation look-aside buffer a linked list of those pages of information presently stored in cache memory which have been addressed at that line. When the processor does a jump, the processor hardware determines from the line address the line to which to jump. Based on that line number, it checks to see if either of the two pages at that line is the correct page. If a page address matches, the virtual address translates to the physical address in the cache memory 18 at which the information is stored. When a cache miss occurs because the virtual page address is not stored at the appropriate line address of the translation look-aside buffer, the miss generates an exception which is sent to the operating system with the address sought. The operating system uses the line address portion of the virtual address to access a list of pages still stored in the cache memory 18 which have been addressed at the particular line. If the page is present on the list, its virtual and physical addresses are placed in the translation look-aside buffer at the appropriate line; and the address replaced is added to the list for the particular line of the translation look-aside buffer. To accomplish this, the least used one of the sets of addresses on the addressed line in the translation look-aside buffer is invalidated, the new set of addresses is copied into the translation look-aside buffer over the invalid set, and the translation look-aside buffer entry of the old set of addresses is added to the linked list for that line number. Then, whenever a cache miss occurs, the list for that line is checked to see if the page is still in the cache memory 18.

If the virtual address matches any of the pages on the list, the least used translation look-aside buffer set of addresses at the line is replaced with the set of addresses being accessed. The information in the cache is left as it was. If when the list is referred to the page is not on the list, it is determined whether all pages in the cache are in use. If they are all in use, one of the pages is at random invalidated, the new page is copied from main memory over the invalid page, and its address is added to the translation look-aside buffer and to the list of pages for that line. If there is still room in the cache memory 18 for another page from main memory 15, rather than invalidating the page of information whose address is presently stored at the accessed line in the translation look-aside buffer, the old page address is added to the linked list for that line and a new page is allocated from one of the unused pages in cache memory. The data from main memory 15 is copied into the new page, and its address is added to the translation look-aside buffer and the linked list of pages. Then, when next the address is accessed, the linked list is referred to; and, if the page is still in the cache memory 18, the translation look-aside buffer address is modified but no data is moved.

Thus, only the entry in the translation look-aside buffer is changed while the information in the cache memory 18 stays the same. This operation may be made to overlap other operations so that it takes no clock time in the operation of the system 30 as contrasted with the time required to fill the cache memory 18 when a page needs to be replaced.

Basically, the system keeps a linked list of all pages currently in the cache memory 18. When a cache miss occurs, the list is referred to; and if the page is still in the cache memory 18, the linked list is modified but no data is moved. The system simply replaces the physical address in the translation look-aside buffer with the extra page physical address that is still in the cache memory 18. Rather than thrashing the data in the cache memory 18, the invention operates to replace the very small amount of address information stored in the translation look-aside buffer.

Although this optimizing operation may be accomplished by hardware, in the preferred embodiment of the invention, software is utilized. C language source code for implementing the particular operation is attached hereto as Appendix A.

Although the present invention has been described in terms of a preferred embodiment, it will be appreciated that various modifications and alterations might be made by those skilled in the art without departing from the spirit and scope of the invention. The invention should therefore be measured in terms of the claims which follow.

```
/*********************************************************************
```

APPENDIX - A

```
/********************************************************************* define CACHE_LINES  32          /* number of lines in TLB */
define PAGE_SIZE    1024        /* size of each page */
#define CACHE_SIZE   (64-48)     /* pages in cache */
define INVALID      (-0)        /* mark entry as invalid */ typedef unsigned long ulong;
typedef int boolean;

struct {                         /* the TLB is actually hardware inside Am29000 */
    struct {                     /* two sets */
        ulong   virtual;         /* virtual address */
        ulong   physical;        /* physical translation */
    } set_A[CACHE_LINES];
    struct {
        ulong   virtual;         /* virtual address */
        ulong   physical;        /* physical translation */
    } set_B[CACHE_LINES];
} tlb ;
```

```
typedef struct _pd {                /* cache page descriptor */
    ulong   virtual;                /* virtual address in main memory */
    ulong   physical;               /* physical address in cache */
    ulong   line;                   /* TLB line number */
    struct _pd  *next;              /* forward list linkage */
    struct _pd  *prev;              /* backward list linkage */
} PageDesc;

PageDesc    *page_table[CACHE_LINES];   /* one list per TLB line */
PageDesc    *inv_table[CACHE_SIZE];     /* inverse table pointing to entry for each p
PageDesc    pd_pool[CACHE_SIZE];        /* pool of descriptors for linking */
boolean     page_map[CACHE_SIZE];       /* in_use bit for each page in cache */
int         pd_pool_index = 0;
boolean     all_mapped = 0;             /* indicates that all cache pages are used */

/*
    Initialize data structures.

*/ initialize()

{
    int i;

for ( i = 0; i < CACHE_LINES; i++ ) {       /* clear TLB and page table */
        tlb.set_A[i].virtual = INVALID;
        tlb.set_B[i].virtual = INVALID;         /* both sets */
        page_table[i] = NULL;
    }
    for (i =0; i < CACHE_SIZE; i++ ) {          /* clear page use map */
        page_map[i] = 1;
    }
    all_mapped = 0;
    pd_pool_index = 0;
}

/*
    Page miss handler - entered when virtual address does not match either
    set in TLB. Returns with physical address which is updated in TLB.
*/ page_miss(virtual)
ulong virtual;

{
    int         line_num;                   /* TLB line number */
    int         i;
    PageDesc    *pd;
    PageDesc    *sacrifice;
    PageDesc    *npd;

line_num = (virtual/PAGE_SIZE) % CACHE_LINES;   /* done with SHIFT and AND */

/* see if we have a PageDesc already existing in the
    page table.

*/ for ( pd = page_table[line_num]; pd != NULL; pd = pd->next ) {
        if ( pd->virtual == virtual ) {
            return(pd->physical);
        }
        if ( pd->next == NULL )
            break;
    }

/*
```

```
/*
If there is room in cache, then we use the first empty page we
find in page_map, copy it from main memory, add a page descriptor
to the end of the list for the current TLB line.

*/ if ( !all_mapped ) {
    for (i=0; i < CACHE_SIZE; i++ ) {
        if ( page_map[i] ) {
            page_map[i] = 0;                /* mark as used */
            npd = &pd_pool[i];              /* allocate a descriptor */
            npd->next = NULL;               /* link descriptor to list */
            if ( pd == NULL ) {
                npd->prev = NULL;
                page_table[line_num] = npd;
            }
            else {
                npd->prev = pd;
                pd->next = npd;
            }
            pd = npd;
            pd->virtual = virtual;
            pd->physical = i * PAGE_SIZE;   /* physical address for cache pag */
            pd->line = line_num;
            copy_page_to_cache(virtual,pd->physical);
            inv_table[i] = pd;              /* set inverse table for unmappir */
            return(pd->physical);
        }
    }
    all_mapped = 1;                         /* to save time when fully mapped */
}
/*
If we get here, we have to choose a page to remove from the cache so we can
copy in the needed one. We choose a random page, least recently used replacer
may be slightly better, but appears not worth the effort of keeping track of
usage.

*/ do {
    i = rand() % CACHE_SIZE;
    sacrifice = inv_table[i];
} while ( sacrifice == pd );  /* don't sacrifice last in list to ease linka */

/* unlink page descriptor from its list */ if ( sacrifice->prev != NULL ) {
    sacrifice->prev->next = sacrifice->next;
} else {
    if ( page_table[sacrifice->line] == sacrifice )
        page_table[sacrifice->line] = sacrifice->next;
}
if ( sacrifice->next != NULL ) {
    sacrifice->next->prev = sacrifice->prev;
}
sacrifice->prev = pd;
sacrifice->next = NULL;
if ( pd != NULL )
    pd->next = sacrifice;
else
    page_table[line_num] = sacrifice;
pd = sacrifice;

/* invalidate page entry and copy new page to cache */ invalidate(sacrifice->virtual,sacrifice->line);
copy_page_to_cache(virtual,pd->physical);
pd->virtual = virtual;
pd->line = line_num;
return(pd->physical);
```

```
}

/*
Copy is performed using special hardware feature in Tony's gate array.
*/ copy_page_to_cache(virt,phys)
ulong *virt,*phys;
{

}

/*
Invalidate page mapping in tlb.
*/ invalidate(virt,line)
{
    if ( tlb.set_A[line].virtual == virt )
        tlb.set_A[line].virtual = INVALID;
    else if ( tlb.set_B[line].virtual == virt )
        tlb.set_B[line].virtual = INVALID;
}
```

What is claimed is:

1. In a computer system having a central processing unit coupled to a main memory and a cache memory wherein blocks of said main memory are organized as pages having a predetermined number of bytes, a cache management system comprising:

a) memory management unit means integrated with said central processing unit for assigning virtual addresses to data stored in said cache memory and for transferring page sized blocks of data from said main memory to said cache memory by a read operation on said main memory and a write operation on said cache memory, said virtual addresses being used by said memory management unit means to determine whether data being addressed by said central processing unit is located in said cache memory or said main memory;

b) means coupled to said memory management means, said cache memory and said main memory for determining whether data at an address which is required to be accessed by said central processing unit is not in said cache memory, and for such data, commencing said read operation and prior to completion of said read operation, commencing said write operation such that said data being read from said main memory is substantially simultaneously written to said cache memory.

2. The system defined by claim 1 wherein said cache memory determining and overlapping means comprises:
   a) a counter;
   b) means for initializing said counter with a start address within said cache memory to which a first byte read from said main memory is to be written;
   c) means for incrementing said counter as said data is being read from said main memory for writing to said cache memory until a complete page has been written.

3. The system defined by claim 2 wherein said memory management unit means comprises means for storing a set of virtual addresses identifying pages of data within said cache memory and a corresponding set of physical addresses within said cache memory, each of said vertical addresses and its corresponding physical address being a virtual and physical address pair each said virtual and physical address pair forming a single row within a two-way set associative memory.

4. The system defined by claim 3 wherein said memory management unit means further comprises for each of said rows in said two-way set associative memory, a linked list identifying pages within said cache memory addressed at the same one of said rows.

* * * * *